(12) United States Patent
Galati et al.

(10) Patent No.: US 9,827,701 B2
(45) Date of Patent: Nov. 28, 2017

(54) VALVE SYSTEM IN AN INJECTION MOLDING SYSTEM

(71) Applicant: Synventive Molding Solutions, Inc., Peabody, MA (US)

(72) Inventors: Vito Galati, Rowley, MA (US); Zhuang Rui Tan, Evanston, IL (US)

(73) Assignee: Synventive Molding Solutions, Inc., Peabody, MA (US)

( * ) Notice: Subject to any disclaimer, the term of this patent is extended or adjusted under 35 U.S.C. 154(b) by 216 days.

(21) Appl. No.: 14/972,307

(22) Filed: Dec. 17, 2015

(65) Prior Publication Data

US 2016/0144543 A1    May 26, 2016

Related U.S. Application Data

(63) Continuation of application No. PCT/US2015/061550, filed on Nov. 19, 2015.
(Continued)

(51) Int. Cl.
*B29C 45/23* (2006.01)
*F16K 11/06* (2006.01)
(Continued)

(52) U.S. Cl.
CPC ............ *B29C 45/231* (2013.01); *B29C 45/03* (2013.01); *B29C 45/2703* (2013.01);
(Continued)

(58) Field of Classification Search
CPC ........... B29C 2945/76006; B29C 2945/76083; B29C 2945/76277; B29C 2945/76384; B29C 45/03; B29C 45/231; B29C 45/2703; B29C 45/281; B29C 45/7613; B29C 45/82
See application file for complete search history.

(56) References Cited

U.S. PATENT DOCUMENTS

| 2,277,640 | A | * | 3/1942 | Harrington | ............ | B29C 45/82 60/375 |
| 6,214,275 | B1 |  | 4/2001 | Catoen et al. |  |  |

(Continued)

OTHER PUBLICATIONS

Written Opinion of the Int'l. Searching Authority dated Apr. 21, 2016 in Int'l. Appln. No. PCT/US2015/061550.
(Continued)

*Primary Examiner* — Jill L Heitbrink
(74) *Attorney, Agent, or Firm* — Polsinelli PC

(57) ABSTRACT

An injection molding apparatus including:
a valve pin driven by an actuator, the valve pin extending axially through at least a portion of the channel length of the fluid flow channel, the fluid flow channel including a throat, downstream flow of the injection fluid being restricted by a bulb portion of the pin, the valve pin having an intermediate position where downstream flow of injection fluid is unrestricted and a fully downstream position where downstream flow of injection fluid is stopped at both the gate and at the throat, wherein the actuator is driven by a valve assembly comprised of a spool mechanically driven by first and second actuators or solenoids that each separately engage the spool at opposing axial ends to effect movement of the spool back and forth between the drive fluid flow positions.

6 Claims, 10 Drawing Sheets

Related U.S. Application Data

(60) Provisional application No. 62/082,837, filed on Nov. 21, 2014.

(51) Int. Cl.
  *F16K 31/06* (2006.01)
  *B29C 45/03* (2006.01)
  *B29C 45/76* (2006.01)
  *B29C 45/27* (2006.01)
  *B29C 45/28* (2006.01)
  *B29C 45/82* (2006.01)

(52) U.S. Cl.
  CPC ........ *B29C 45/281* (2013.01); *B29C 45/7613* (2013.01); *F16K 11/06* (2013.01); *F16K 31/061* (2013.01); *B29C 45/82* (2013.01); *B29C 2945/76006* (2013.01); *B29C 2945/76083* (2013.01); *B29C 2945/76277* (2013.01); *B29C 2945/76384* (2013.01)

(56) References Cited

U.S. PATENT DOCUMENTS

| | | |
|---|---|---|
| 2002/0086086 A1 | 7/2002 | Doyle et al. |
| 2002/0121713 A1* | 9/2002 | Moss ...................... B29C 45/27 |
| | | 264/40.7 |
| 2004/0166189 A1* | 8/2004 | Babin ................. B29C 45/2806 |
| | | 425/144 |
| 2005/0010062 A1 | 5/2005 | Tooman et al. |
| 2014/0001385 A1 | 1/2014 | Scott |
| 2014/0209826 A1* | 7/2014 | Funakubo ........... F16K 31/0613 |
| | | 251/129.08 |

OTHER PUBLICATIONS

Int'l. Preliminary Report on Patentability dated Feb. 8, 2017 in Int'l. Appln. No. PCT/US2015/061550.

\* cited by examiner

VALVE SYSTEM IN AN INJECTION MOLDING SYSTEM

RELATED APPLICATIONS

This application is a continuation of and claims the benefit of priority to PCT/US15/061550 filed Nov. 19, 2015 which claims priority to U.S. Provisional Application Ser. No. 62/082,837 filed Nov. 21, 2014, the disclosures of which are incorporated by reference in their entirety as if fully set forth in their entirety herein. This application is also continuation-in-part of and claims the benefit of priority to International application serial no. PCT/US13/75064 filed Dec. 13, 2013, International application serial no. PCT/US14/19210 filed Feb. 28, 2014, International application serial no. PCT/US14/31000 filed Mar. 18, 2014 and International application serial no. PCT/US14/52639 filed Aug. 26, 2014, the disclosures of all of the foregoing of which are incorporated by reference as if fully set forth herein.

The disclosures of all of the following are incorporated by reference in their entirety as if fully set forth herein: U.S. Pat. No. 5,894,025, U.S. Pat. No. 6,062,840, U.S. Pat. No. 6,294,122, U.S. Pat. No. 6,309,208, U.S. Pat. No. 6,287,107, U.S. Pat. No. 6,343,921, U.S. Pat. No. 6,343,922, U.S. Pat. No. 6,254,377, U.S. Pat. No. 6,261,075, U.S. Pat. No. 6,361,300 (7006), U.S. Pat. No. 6,419,870, U.S. Pat. No. 6,464,909 (7031), U.S. Pat. No. 6,599,116, U.S. Pat. No. 7,234,929 (7075US1), U.S. Pat. No. 7,419,625 (7075US2), U.S. Pat. No. 7,569,169 (7075US3), U.S. patent application Ser. No. 10/214,118, filed Aug. 8, 2002 (7006), U.S. Pat. No. 7,029,268 (7077US1), U.S. Pat. No. 7,270,537 (7077US2), U.S. Pat. No. 7,597,828 (7077US3), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068), U.S. application Ser. No. 10/101,278 filed Mar. 19, 2002 (7070) and international applications PCT/US2011/062099 and PCT/US2011/062096.

BACKGROUND OF THE INVENTION

Injection molding systems having fluid distribution valve systems including proportional control valve systems have been employed in injection molding systems used in a wide variety of environments and applications where the valve systems including the fluid valves themselves and the fluid manifold that feeds the valve system is mounted outside the hot half space or area of the injection molding systems where the heated fluid distribution hotrunner or manifold is mounted. Such systems as disclosed in international applications PCT/US2011/062099 and PCT/US2011/062096 purposely mount the actuators at an extended distance away from the heated manifold chamber or space within the heated manifold is mounted or disposed in order to protect the integrity of the valves and valve system generally. The valve systems in such prior apparatuses cannot achieve an immediate, fast or quick movement response by the actuators in reaction to the supply of drive fluid the the proportional control valves that are interconnected to the actuators, especially in the case of gas or pneumatic systems at least because the overly long physical distance between the communication ports of the valve system and the fluid ports of the actuators prevents the fluid from providing an immediate response in movement of the piston of the actuator.

SUMMARY OF THE INVENTION

In accordance with the invention there is provided an injection molding apparatus (1000) comprising an injection molding machine (900), a manifold (21) that receives injection fluid (902) from the machine (900) and routes the injection fluid during the course of an injection cycle from an upstream end toward a downstream end of a fluid flow channel (54b) disposed in the manifold (21) or a nozzle (45) communicating (19) with the manifold (21), the fluid flow channel (45b) having a flow axis (AX) and a channel length, the fluid flow channel communicating at the downstream end with a gate (105) to a cavity (120) of a mold, the apparatus including:

a valve pin (40) driven by an actuator (30), the valve pin (40) extending axially through at least a portion of the channel length of the fluid flow channel (45b), the valve pin having an upstream end interconnected to the actuator and a downstream end (40d), the valve pin being drivable by the actuator axially upstream and downstream through the fluid flow channel, the fluid flow channel (45b) including a throat (T) having an inner circumferential surface ((TS) having a selected throat configuration and throat diameter (TD), the valve pin having bulbous portion (B) having an outer circumferential surface (OBS) and a bulb diameter (BD) adapted to interface with the inner circumferential surface (TS) of the throat (T) to enable a restricted degree of volume or velocity of flow of injection fluid (902) relative to a maximum degree of volume or velocity of flow when the bulbous portion (B) of the valve pin is axially aligned (AL) with the throat (T), the valve pin (40) being drivable to a maximum downstream position where a distal tip end (40d) of the valve pin closes the gate (105) and stops flow of the injection fluid (902) through the gate (105).

The actuator (40) is preferably driven by a valve assembly (10) comprised of a housing (20) and a spool (50) slidably mounted and controllably movable back and forth along an axis (A) within the housing between two or more drive fluid flow positions, the spool (50) being mechanically driven by first and second actuators or solenoids (70a, 70b) that each separately engage the spool at opposing axial ends to effect movement of the spool (50) back and forth between the drive fluid flow positions.

The actuators or solenoids are preferably drivable in only one linear direction and adapted such that the first solenoid or actuator drives the spool in a first linear direction and the second solenoid or actuator drives the spool in a second linear direction opposite the first linear direction, the first and second solenoids or actuators being drivable at different times such that the spool is driven by only one or the other of the first and second solenoids or actuators at any one selected point in time.

The actuators or solenoids can be controllably energizable to drive the spool a distance or length of travel or at a velocity of travel that is proportional to the degree or amount of voltage, current or power that is applied to the actuators or solenoids.

The bulbous portion of the valve pin typically has a diameter that is between about 0.01 and about 0.20 mm less than the throat diameter.

The fluid flow channel and the valve pin are preferably configured or adapted such that the valve pin is movable axially upstream and downstream between an upstream position where the downstream flow of the injection fluid is restricted by the bulb portion of the pin being axially aligned with the throat of the channel, an intermediate position where downstream flow of injection fluid is unrestricted and a fully downstream position where downstream flow of injection fluid is stopped at both the gate and at the throat.

In the upstream position of the valve pin, the bulb portion is preferably axially aligned with the throat, the valve pin including a reduced diameter neck portion that aligns with the throat when the pin is in the intermediate position to enable unrestricted flow of the injection fluid.

The valve pin can include an upstream portion configured or adapted to stop flow of injection fluid through the flow channel when the valve pin is in the fully downstream position.

The upstream position of the valve pin is typically a start position at a beginning of an injection cycle where the bulbous protrusion is axially aligned with the throat, the bulbous protrusion and the throat being adapted to enable a restricted flow of the injection fluid from an upstream side of the bulbous protrusion to a downstream side of the bulbous protrusion that reduces tensile forces on the pin (40).

The upstream position of the valve pin is typically a start position of the valve pin at a beginning of an injection cycle where the bulbous protrusion is axially aligned with the throat to restrict flow of the injection fluid.

The actuator is preferably interconnected to a controller that includes a program that instructs the actuator to position the valve pin at the beginning of the injection cycle such that the bulbous protrusion is axially aligned with the throat.

The actuator is typically drivable at a rate of travel between zero and a maximum rate of travel, the actuator being interconnected to a controller that includes a program that instructs the actuator to drive the valve pin downstream from a start position to the maximum downstream position defining a stroke length, the program including instructions that instruct the actuator to drive the valve pin downstream at a rate of travel beginning from the start position along at least a portion of the stroke length that is less than the maximum rate of travel.

The bulbous portion and the throat are preferably configured or adapted to enable a restricted flow of injection fluid that reduces a difference in pressure between fluid disposed upstream of the throat and fluid disposed downstream of the throat when the bulbous portion and the throat are axially aligned.

The bulbous portion and the throat are preferably configured or adapted to enable a restricted flow of injection fluid that lowers a difference in pressure of injection fluid upstream of the throat and injection fluid downstream of the throat when the bulbous portion and throat are axially aligned to a level that reduces or eliminates a spike or peak in pressure of injection fluid at the gate above a selected maximum pressure.

In another aspect of the invention there is provided a method of forming a part by operation of an apparatus as described above comprising injecting an injection fluid from the injection molding machine into the manifold and controlling flow of the injection fluid into the cavity by use of the controller such that the actuator is instructed to drive the valve pin downstream from the start position to the gate closed position at a rate of travel beginning from the start position along at least a portion of the stroke length that is less than the maximum rate of travel.

In another aspect of the invention there is provided an injection molding apparatus (1000) comprising an injection molding machine (900), a manifold (21) that receives injection fluid (902) from the machine (900) and routes the injection fluid (902) during the course of an injection cycle from an upstream end toward a downstream end of a fluid flow channel (45*b*) disposed in the manifold (21) or a nozzle (45) communicating (19) with the manifold, the fluid flow channel having a flow axis (AX) and a channel length, the fluid flow channel (45*b*) communicating at the downstream end with a gate (105) to a cavity (120) of a mold, the apparatus (1000) including:

a valve pin (40) driven by an actuator (30), the valve pin extending axially (AX) through at least a portion of the channel length of the fluid flow channel, the valve pin (40) having an upstream end interconnected to the actuator and a downstream end (40*d*), the valve pin being drivable by the actuator (30) axially upstream and downstream through the fluid flow channel (45*b*), the fluid flow channel including a throat (T) having an inner circumferential surface (TS) having a selected throat configuration and throat diameter (TD), the fluid flow channel and the valve pin being configured or adapted such that the valve pin (40) is movable axially upstream and downstream between an upstream position where the downstream flow of the injection fluid is restricted by a bulb portion (B) of the pin being axially aligned (AL) with the throat (T) of the channel, an intermediate position where downstream flow of injection fluid (902) is unrestricted (WG) and a fully downstream position where downstream flow of injection fluid is stopped at both the gate (105, 40*d*) and at the throat (TS, UES, UPD, TD).

The actuator is typically driven by a valve assembly (10) comprised of a housing (20) and a spool (50) slidably mounted and controllably movable back and forth along an axis (A) within the housing between two or more drive fluid flow positions, the spool (50) being mechanically driven by first and second actuators or solenoids (70*a*, 70*b*) that each separately engage the spool at opposing axial ends to effect movement of the spool back and forth between the drive fluid flow positions.

The actuators or solenoids (70*a*, 70*b*) are preferably drivable in only one linear direction and adapted such that the first solenoid or actuator drives the spool in a first linear direction (70*ad*) and the second solenoid or actuator drives the spool in a second linear direction (70*bd*) opposite the first linear direction (70*ad*), the first and second solenoids or actuators being drivable at different times such that the spool is driven by only one or the other of the first and second solenoids or actuators at any one selected point in time.

The actuators or solenoids are preferably controllably energizable to drive the spool a distance or length of travel or at a velocity of travel that is proportional to the degree or amount of voltage, current or power that is applied to the actuators or solenoids.

The upstream position of the valve pin is typically a start position at a beginning of an injection cycle where the bulbous protrusion is axially aligned with the throat, the bulbous protrusion and the throat being adapted to enable a restricted flow of the injection fluid from an upstream side of the bulbous protrusion to a downstream side of the bulbous protrusion that reduces tensile forces on the pin (40).

In another aspect of the invention there is provided, an injection molding apparatus (1000) comprising an injection molding machine (900), a manifold (21) that receives injection fluid (902) from the machine and routes the injection fluid during the course of an injection cycle from an upstream end toward a downstream end of a fluid flow channel (45*b*) disposed in the manifold or a nozzle communicating with the manifold, the fluid flow channel (45*b*) having a flow axis (AX) and a channel length, the fluid flow channel communicating at the downstream end with a gate (105) to a cavity (120) of a mold, the apparatus (1000) including:

a valve pin (40) driven by an actuator (30), the valve pin extending axially through at least a portion of the channel length of the fluid flow channel, the valve pin being drivable between a downstream gate closed position, an upstream gate open position where injection fluid flows freely through the gate, the actuator being interconnected to and driven by a valve assembly (10) comprised of a housing (20) and a spool (50) slidably mounted and controllably movable back and forth along an axis (A) within the housing between two or more drive fluid flow positions, the spool being mechanically driven by first and second actuators or solenoids (70*a*, 70*b*) that each separately engage the spool at opposing axial ends to effect movement of the spool back and forth (70*ad*, 70*bd*) between the drive fluid flow positions, the first and second actuators or solenoids being drivable in only one linear direction (70*ad*, 70*bd*) and adapted such that the first solenoid or actuator (70*a*) drives the spool in a first linear direction and the second solenoid or actuator (70*bd*) drives the spool in a second linear direction opposite the first linear direction, the first and second solenoids or actuators being drivable at different times such that the spool is driven by only one or the other of the first and second solenoids or actuators at any one selected point in time.

The actuators or solenoids are preferably controllably energizable to drive the spool a distance or length of travel or at a velocity of travel that is proportional to the degree or amount of voltage, current or power that is applied to the actuators or solenoids.

The fluid flow channel typically includes a throat having an inner circumferential surface having a selected throat configuration and throat diameter, the valve pin having bulbous portion having an outer circumferential surface (OBS) and a bulb diameter adapted to interface with the inner circumferential surface of the throat to enable a restricted degree of volume or velocity of flow of injection fluid relative to a maximum degree of volume or velocity of flow when the bulbous portion of the valve pin is axially aligned with the throat, the valve pin being drivable to a maximum downstream position where a distal tip end of the valve pin closes the gate and stops flow of the injection fluid through the gate.

The fluid flow channel and the valve pin are typically configured or adapted such that the valve pin is movable axially upstream and downstream between an upstream position where the downstream flow of the injection fluid is restricted by the bulb portion of the pin being axially aligned with the throat of the channel, an intermediate position where downstream flow of injection fluid is unrestricted and a fully downstream position where downstream flow of injection fluid is stopped at both the gate and at the throat.

The bulbous portion and the throat are preferably configured or adapted to enable a restricted flow of injection fluid that reduces a difference in pressure between fluid disposed upstream of the throat and fluid disposed downstream of the throat when the bulbous portion and the throat are axially aligned.

The bulbous portion and the throat are preferably configured or adapted to enable a restricted flow of injection fluid that lowers a difference in pressure of injection fluid upstream of the throat and injection fluid downstream of the throat when the bulbous portion and throat are axially aligned to a level that reduces or eliminates a spike or peak in pressure of injection fluid at the gate above a selected maximum pressure.

The first and second solenoids or actuators are preferably interconnected to and controllably driven by a controller containing a program that instructs the first and second solenoids or actuators to drive the spool to selected ones of the two or more drive fluid positions that cause the actuator to drive the valve pin from the downstream gate closed position to the upstream gate open position defining a stroke length at one or more predetermined rates of travel over the course of travel of the valve pin along the stroke length.

The first and second solenoids are preferably interconnected to and controllably driven by a controller containing a program that instructs the first and second solenoids to drive the spool to selected ones of the two or more drive fluid positions that cause the actuator to drive the valve pin from the downstream gate closed position to the upstream gate open position defining a stroke length at a rate of travel beginning from the start position along at least a portion of the stroke length that is less than the maximum rate of travel.

The actuators or solenoids are preferably controllably energizable to drive the spool a distance or length of travel or at a velocity of travel that is proportional to the degree or amount of voltage, current or power that is applied to the actuators or solenoids.

In another aspect of the invention there is provided a method of forming a part by operation of an apparatus as described above comprising injecting an injection fluid from the injection molding machine into the manifold and controlling flow of the injection fluid into the cavity by use of the controller to actuate the first and second solenoid at different times over the course of the injection cycle such that the spool is driven by only one or the other of the first and second solenoids at any one selected point in time.

In another aspect of the invention there is provided an injection molding apparatus comprising an injection molding machine, a manifold that receives injection fluid from the machine and routes the injection fluid during the course of an injection cycle from an upstream end toward a downstream end of a fluid flow channel disposed in the manifold or a nozzle communicating with the manifold, the fluid flow channel having a flow axis and a channel length, the fluid flow channel communicating at the downstream end with a gate to a cavity of a mold, the apparatus including:

a valve pin driven by an actuator, the valve pin extending axially through at least a portion of the channel length of the fluid flow channel, the valve pin having an upstream end interconnected to the actuator, a downstream end movable by the actuator between a gate closed position and an upstream gate open position where fluid flows freely through the gate, the valve pin including a bulbous protrusion disposed between the upstream end and the downstream end, the fluid flow channel including a throat having an inner circumferential surface having a selected throat configuration and throat diameter, the bulbous protrusion having an outer circumferential surface (OBS) having a bulb configuration that is complementary to the throat configuration and a bulb diameter, the actuator being adapted to controllably drive the valve pin between a downstream gate closed position where the pin prevents injection fluid from flowing through the gate, an upstream gate open position where injection fluid flows freely through the gate and an intermediate maximum flow restriction position where the outer surface of the bulbous protrusion is disposed in an axial alignment position with the throat, the bulb diameter and the throat diameter being selected such that a gap is formed between the outer circumferential surface of the bulbous protrusion and the inner circumferential surface of the throat that enables flow of injection through the gate at a flow rate that relieves pressure in the injection fluid upstream of the throat section.

The gap that is formed between the outer circumferential surface of the bulbous protrusion and the inner circumferential surface of the throat is preferably between about 0.05 mm and about 0.20 mm.

The valve pin is typically disposed in a start position at the beginning of the injection cycle such that the bulbous protrusion is disposed in or near the axial alignment position with the throat.

The actuator is preferably interconnected to a controller that includes a program that instructs the actuator to position the valve pin at the beginning of the injection cycle such that the bulbous protrusion is disposed in or near the axial alignment position with the throat.

The actuator is drivable at a rate of travel between zero and a maximum rate of travel, the actuator being interconnected to a controller that includes a program that instructs the actuator to drive the valve pin downstream from the start position to the gate closed position defining a stroke length, the program including instructions that instruct the actuator to drive the valve pin downstream at a rate of travel beginning from the start position along at least a portion of the stroke length that is less than the maximum rate of travel.

In another aspect of the invention there is provided a method of forming a part by operation of the apparatus described immediately above, the method comprising injecting an injection fluid from the injection molding machine into the manifold and controlling flow of the injection fluid into the cavity by use of the controller such that the actuator is instructed to drive the valve pin downstream from the start position to the gate closed position at a rate of travel beginning from the start position along at least a portion of the stroke length that is less than the maximum rate of travel.

In another aspect of the invention there is provided an injection molding apparatus comprising an injection molding machine, a manifold that receives injection fluid from the machine and routes the injection fluid during the course of an injection cycle from an upstream end toward a downstream end of a fluid flow channel disposed in the manifold or a nozzle communicating with the manifold, the fluid flow channel having a flow axis and a channel length, the fluid flow channel communicating at the downstream end with a gate to a cavity of a mold, the apparatus including:

a valve pin driven by an actuator, the valve pin extending axially through at least a portion of the channel length of the fluid flow channel, the valve pin being drivable between a downstream gate closed position, an upstream gate open position where injection fluid flows freely through the gate, the actuator being driven by a valve assembly comprised of a housing and a spool slidably mounted and controllably movable within the housing between two or more drive fluid flow positions, the spool being mechanically driven by first and second controllably driven plungers or pistons that each separately engage the spool at opposing axial ends to effect movement of the spool between the drive fluid flow positions, the plungers or pistons being driven that the first plunger or piston drives the spool in a first linear direction and the second plunger or piston drives the spool in a second linear direction opposite the first linear direction, the first and second plungers or pistons always being driven at different times such that the spool is driven by only one or the other of the first and second solenoids at any selected point in time.

The first and second plungers or pistons are preferably driven by a solenoid that is controllably energizable to drive the plungers or pistons in the first and second linear directions at predetermined times and preselected rates of travel over the course of the injection cycle.

The first and second plungers or pistons are preferably interconnected to and controllably driven by a controller containing a program that instructs the first and second plungers or pistons to drive the spool to selected ones of the two or more drive fluid positions that cause the actuator to drive the valve pin between the downstream gate closed position and the upstream gate open position defining a stroke length, the valve pin being driven at one or more predetermined rates of travel over the course of travel of the valve pin along the stroke length.

The first and second plungers or pistons can be interconnected to and controllably driven by a controller containing a program that instructs the first and second plungers or pistons to drive the spool to selected ones of the two or more drive fluid positions that cause the actuator to drive the valve pin from the downstream gate closed position to the upstream gate open position defining a stroke length, the valve pin being driven along one or more predetermined profiles of pin position over the course of travel of the pin along the stroke length.

The first and second plungers or pistons can be interconnected to and controllably driven by a controller containing a program that instructs the first and second plungers or pistons to drive the spool to selected ones of the two or more drive fluid positions that cause the actuator to drive the valve pin from the downstream gate closed position to the upstream gate open position defining a stroke length, the valve pin being driven at a rate of travel beginning from the start position along at least a portion of the stroke length that is less than the maximum rate of travel.

In another aspect of the invention there is provided a method of forming a part by operation of the apparatus described immediately above, the method comprising injecting an injection fluid from the injection molding machine into the manifold and controlling flow of the injection fluid into the cavity by use of the controller to actuate the first and second solenoid at different times over the course of the injection cycle such that the spool is driven by only one or the other of the first and second plungers or pistons at any selected point in time.

BRIEF DESCRIPTION OF THE DRAWINGS

The above and further advantages of the invention may be better understood by referring to the following description in conjunction with the accompanying drawings in which.

DETAILED DESCRIPTION

Figure 1A:
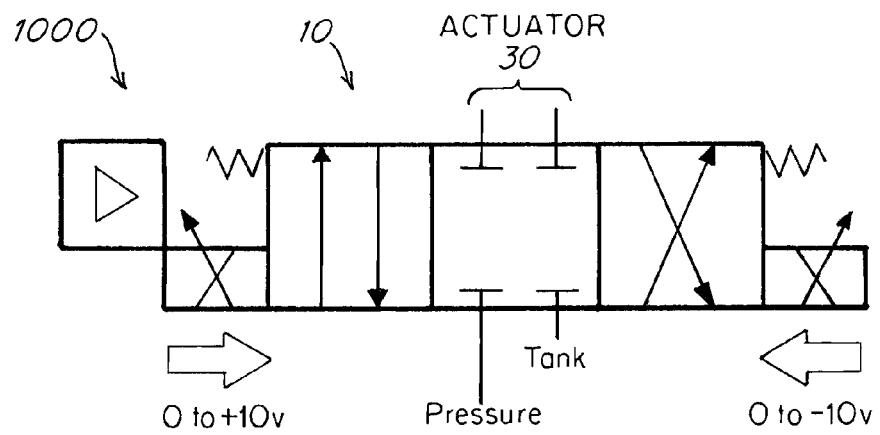
FIG. 1A is a schematic view of one embodiment of a proportional directional control valve component for use in an apparatus according to the invention.
Figure 1B:
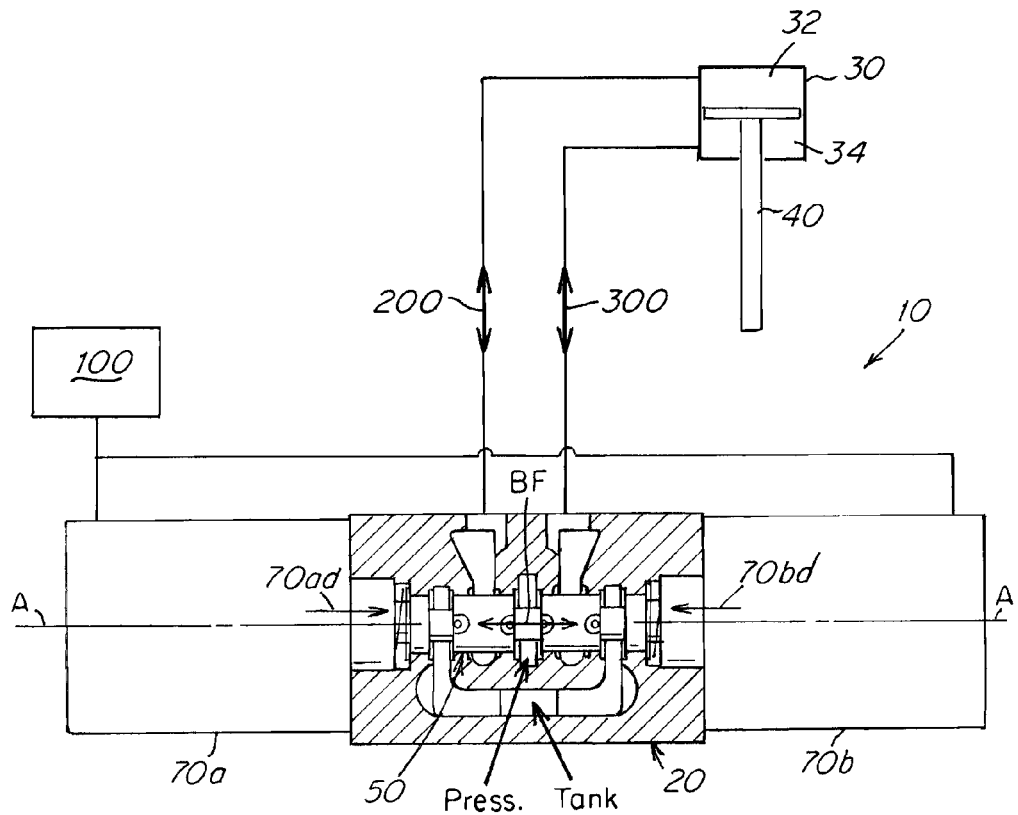
FIG. 1B is a side cross-sectional view of one embodiment of a proportional directional control valve component for use in an apparatus according to the invention.

FIGS. 1A, 1B show one embodiment of a drive fluid valve assembly 10 element of an injection molding system 1000 according to the invention. The valve assembly 10 is comprised of a valve housing 20 having a spool 50 similar to a spool as shown and described in FIG. 28 of U.S. publication 20020086086, the disclosure of which is incorporated herein by reference in its entirety as if fully set forth herein. In the FIGS. 1A, 1B configuration the spool or spool assembly 50 is controllably reciprocally driven back and forth BF by a controller 100 along axis A to route drive fluid (preferably hydraulic liquid such as oil) to and from the drive chambers of a fluid driven actuator 30 that is interconnected to a valve pin 40.

Figure 1C:
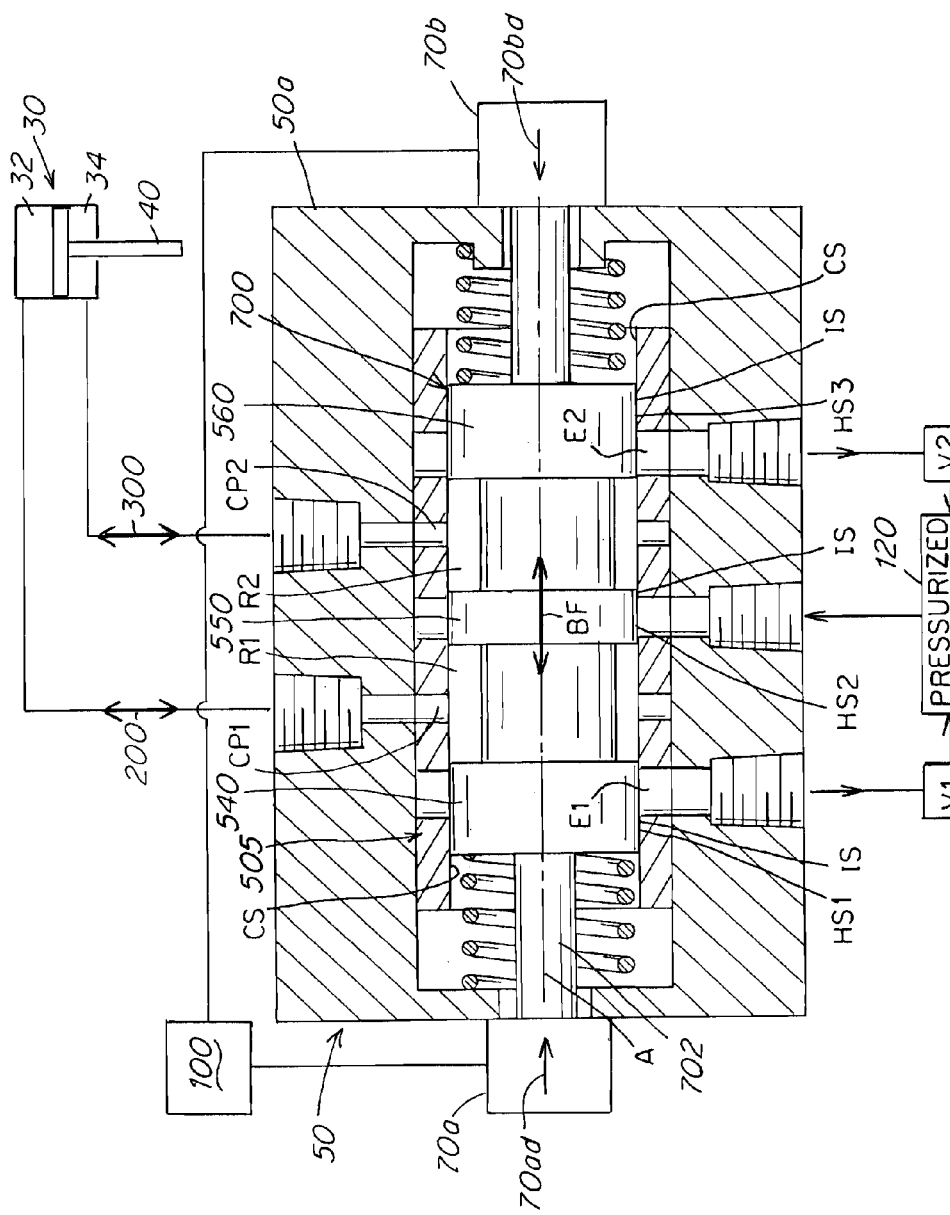
FIG. 1C is a side schematic sectional view of another embodiment of a proportional directional control valve component for use in an apparatus according to the invention.
Figure 1D:
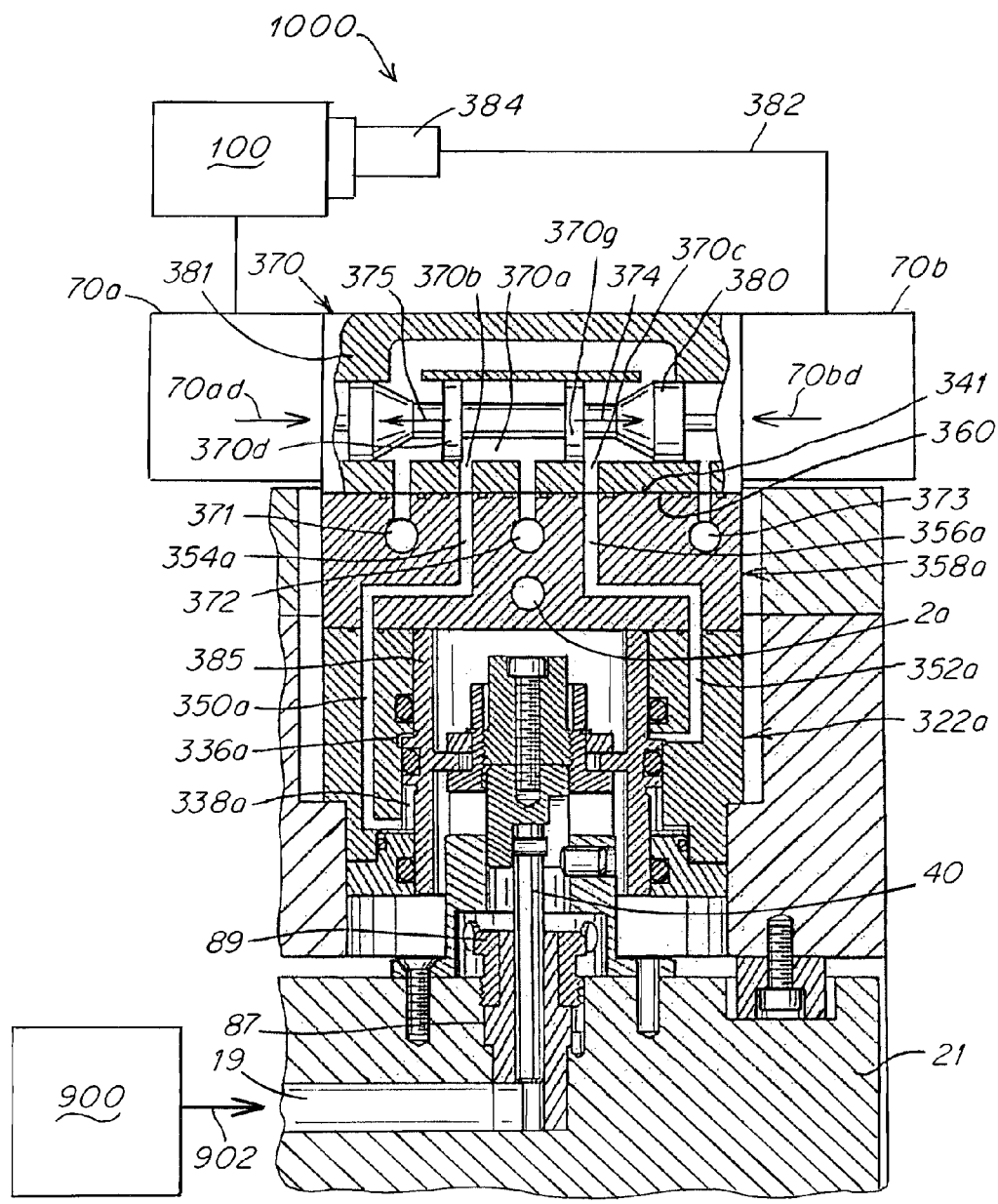
FIG. 1D is a side schematic sectional view of an injection molding apparatus or system according to the invention incorporating another embodiment of a proportional directional control valve component useable in an apparatus according to the invention.

Precise control over the piston or other moving component of a fluid driven actuator such as actuator 30, FIGS. 1A, 1B, 1C or actuator 322a, FIG. 1D, can be more effectively carried out with a proportionally directionally driven valve 50, 370 as shown in FIGS. 1A-1D. A proportional or proportionally directionally driven valve 50, 370 as used herein is a valve having a moving member such as a spool that is driven by and travels a distance that is proportional to the amount or degree of electrical voltage, power, current or energy that is applied to the drive mechanism such as a solenoid that is interconnected to and drives the moving member of the valve.

The spool assembly 50, FIGS. 1A-1C, (370, FIG. 1D) is controllably drivable back and forth BF (374, 375) along a linear travel path A by engagement or interconnection to a pair of opposing solenoid driven actuators 70a, 70b that are controllably driven such that each separate actuator 70a, 70b only drives the solenoid in one direction 70ad, 70bd always at separate times that are controlled by controller 100. The actuators or solenoids 70a, 70b most preferably are adapted to drive the spool in their respective one direction 70ad, 70bd along, to or along a length or distance of travel or a magnitude of velocity that is proportional to one or more of electrical voltage, current or power that is applied to the electric drive mechanism such as a solenoid that is interconnected to and drivably moves the spool 50. In one embodiment of the present invention two separate drive mechanisms such as the two solenoids or actuators 70a, 70b are interconnected to and drive the spool in one direction only, the controller 100 that directs the drive of the actuators or solenoids being adapted to enable the driving of only one of the two actuator 70a, 70b at a single time.

The controller 100 is also provided with a program that includes instructions and predetermined data such as a profile of pin position data that instruct the actuators or solenoids 70a, 70b to be driven according to a predetermined degree of input of electrical voltage, current or power at predetermined times over the course of an injection cycle so as to position the pin 40 at positions that match a predetermined profile of preferred pin positions over the course of an injection cycle.

The spool 50 is typically centered within the axial center of the housing such that the heads and recesses of the spool 50 are properly positioned for opening and closing fluid flow ports provided in the valve housing 20, the ports being drive fluid flow sealably connected to the upstream and downstream drive chambers of the actuator 30.

One configuration embodiment of a spool assembly 50 is shown in FIG. 10 which includes a spool 700 having heads 540, 550, 560 with respective outer circumferential head surfaces HS1, HS2, HS3. A fluid seal such as an O-ring or the equivalent can be disposed between the head surfaces HS1, HS2, HS3 and the interior interface surfaces CS of the cylinder 505 so as to seal the recesses R1, R2 disposed between the heads against fluid flow between the recesses.

Alternatively, the respective interior interface surfaces CS of the cylinder 505 can be machined to close tolerances so as to form a micro gap at the interfaces IS between the head surfaces HS1, HS2, HS3 of each head and the adjacent opposing surface of the interior wall surface CS of the cylinder 505 in the range of 1 to 10 micrometers, thereby avoiding the need for the use of a separate fluid seal, such as a polymeric layer of material such as a film or O-ring, at or between the interfaces IS of such surfaces. Such avoidance of the use of separate fluid seals at the interfaces IS reduces friction at the interfaces and enables the spool 700 to respond more quickly to force that is applied by drive mechanisms 70a, 70b that drives the spool to travel laterally BF along axis A.

The spool 700 is preferably controllably driven back and forth BF along axis A by the pair of opposing solenoid driven actuators 70*a*, 70*b* that are controllably driven by controller 100 that includes a program having instructions that control the solenoid driven actuators to drive the spool 700 such that each separate actuator 70*a*, 70*b* only drives the solenoid and the interconnected shaft of the spool 700 in one direction 70*ad*, 70*bd* always at separate times in one direction, either 70*ad* or 70*bd*. The spool 700 is typically centered within the axial center of the housing 50*a* such that the heads and recesses of the spool 700 are properly positioned for opening and closing fluid flow ports CP1, CP2 provided in the valve housing 50*a*, the ports being drive fluid flow sealably connected to the upstream and downstream drive chambers of the actuator 30.

As shown in FIG. 10, the valve assembly 500 comprises a spool valve member 700 comprised of and configured in the form of an axial rod or shaft 702, heads 540, 550, 560, recesses R1, R2 disposed between the heads and a sealed cylinder 505. The spool valve member 700 is slidably drivable within the interior of the cylinder 505, the interior wall surface CS of the cylinder 505 being formed to have a diameter essentially the same as the outside diameter of the outer circumferential surfaces HS1, HS2, HS3 of the heads 540, 550, 560 respectively. The outside surfaces HS1, HS2, HS3 of the heads 540, 550, 560 can be integral with each other such that there is no other material disposed between the heads 540, 550, 560 and the interfaces of surfaces HS1, HS2, HS3 and the interior wall surface CS of the cylinder 505 to form a seal against flow of pressurized gas along or through the interfaces.

The spool valve member 700 is drivable LS laterally back and forth L along its axis A and depending on the precise lateral position BF of the member 700. The precise lateral BF position of the heads 540, 550, 560 relative to the flow ports or apertures CP1, CP2 in the cylinder housing 504, 505 determines the direction and degree of flow of pressurized fluid back and forth 200, 300 to and from the drive chambers 32, 34 of the actuator 30. Further depending on the precise lateral BF positioning of the spool valve member 700 pressurized fluid will vent or evacuate through one of two vents V1, V2 to a reservoir of fluid 120 such as a tank of fluid or in the case of a pneumatic system ambient air.

FIG. 1D shows a more detailed arrangement and interconnection of components of an entire injection molding system 1000 according to the invention. As shown an injection molding machine 900 feeds pressured injection fluid 902 into a distribution channel 19 of a heated manifold or hotrunner 21 on which an actuator 322*a* is mounted and through which the valve pin 41 extends. As discussed in greater detail herein the valve pin 40 is controllably drivable to open and close a gate 105 to the cavity 120 of a mold.

With reference to the system shown in FIG. 1D, the drive fluid for the actuator 322*a* may be supplied by a common manifold or fluid feed duct 358*a*. Such common fluid feed ducts are most preferably independent of the fluid driven actuators, i.e. the ducts do not comprise a housing component of the actuators but rather the actuators have a self contained housing, independent of the fluid feed manifold 358*a*, which houses a sealably enclosed cavity in which a piston is slidably mounted. For example, as shown in FIG. 1D, the fluid input/output ports 350*a*, 352*a* of independent actuator 322*a* are sealably mated with the fluid input output ports 354*a*, 356*a* of a fluid manifold 358*a* which commonly delivers actuator drive fluid (such as oil or air) to the sealed drive chambers 336*a*, 338*a* of actuator 322*a*. Most preferably, the ports 354*a*, 356*a* of the manifold 358*a* are sealably mated with their complementary actuator ports 350*a*, 352*a* via compression mating of the undersurface 360 of the manifold 358*a*) with the upper surface 341 of the actuator 322*a*. As can be readily imagined a plurality of actuators may also utilize a manifold plate which forms a structural component of one or more of the actuators and serves to deliver drive fluid commonly to the actuators, e.g. the manifold plate forms a structural wall portion of the housings of the actuators which serves to form the fluid sealed cavity within which the piston or other moving mechanism of the actuator is housed.

In the FIG. 1D embodiment, a separate proportional valve 370 for each individual actuator 322*a* is mounted on a common drive fluid delivery manifold 358*a*. The manifold 358*a* has a single pressurized fluid delivery duct 372 which feeds pressurized drive fluid first into the distributor cavity 370*a* of the valve 370. The pressurized fluid from duct 372 is selectively routed via left 375 or right 374 movement of plunger or spool 380 either through port 370*b* into piston chamber 338*a* or through port 370*c* into piston chamber 336*a*. The plunger or spool 380 is controllably movable to any left to right 375, 374 (BF) position within sealed housing 381 via drives 70*a*, 70*b* which receives control signals 382 from the controller or CPU 100. The drivers 70*a*, 70*b* typically comprise an electrically driven mechanism such as a solenoid drive, linear force motor or permanent magnet differential motor which is, in turn, controlled by and interconnected to CPU or controller 100 via interface 384 which interprets and communicates control signals from the CPU 100 to the servo drivers 70*a*, 70*b*. Restrictors or projections 370*d* and 370*g* of plunger/spool 380 are slidable over the port apertures 370*b* and *c* to any desired degree such that the rate of flow of pressurized fluid from chamber 370*a* through the ports can be varied to any desired degree by the degree to which the aperture ports 370*b*, 370*g* are covered over or restricted by restrictors 370*d*, 370*g*. The valve 370 includes left and right vent ports which communicate with manifold fluid vent channels 371, 373 respectively for venting pressurized fluid arising from the left 375 or right 374 movement of the plunger/spool 380. Thus, depending on the precise positioning of restrictors 370*d* and 370*g* over apertures 370*b* and 370*c*, the rate and direction of axial movement of piston 385 and pin 40 can be selectively varied and controlled which in turn controls the rate of melt material from manifold channel 19 through a nozzle bore or channel 45*b* formed axially through the body 45*c* of a nozzle 45 and gate 105, FIGS. 3, 5A-5C.

Figure 2:
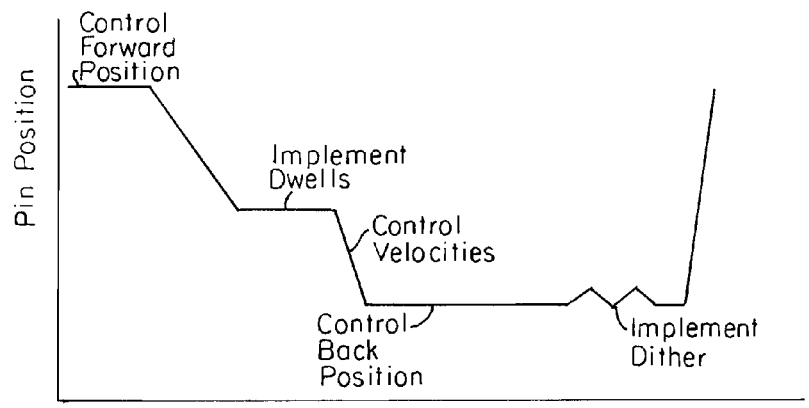
FIG. 2 is an exemplary plot of valve pin position versus time using one preferred embodiment of a valve in an apparatus according to the invention.
Figure 5A:
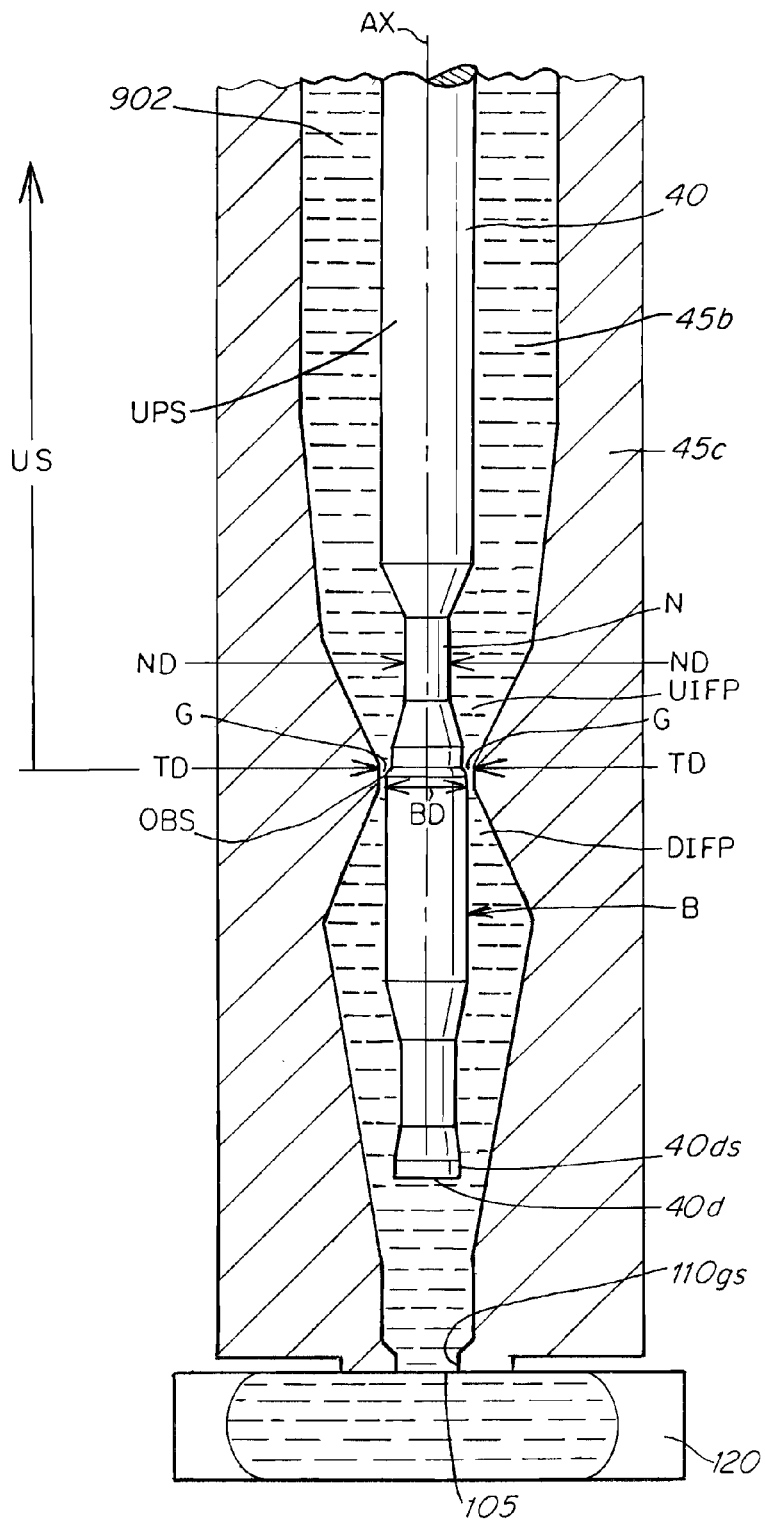
FIG. 5A is a side cross-sectional view of a preferred valve with preferred valve pin configuration components for use in an apparatus according to the invention showing the valve pin disposed at a start position or starting point of an injection cycle.
Figure 5B:
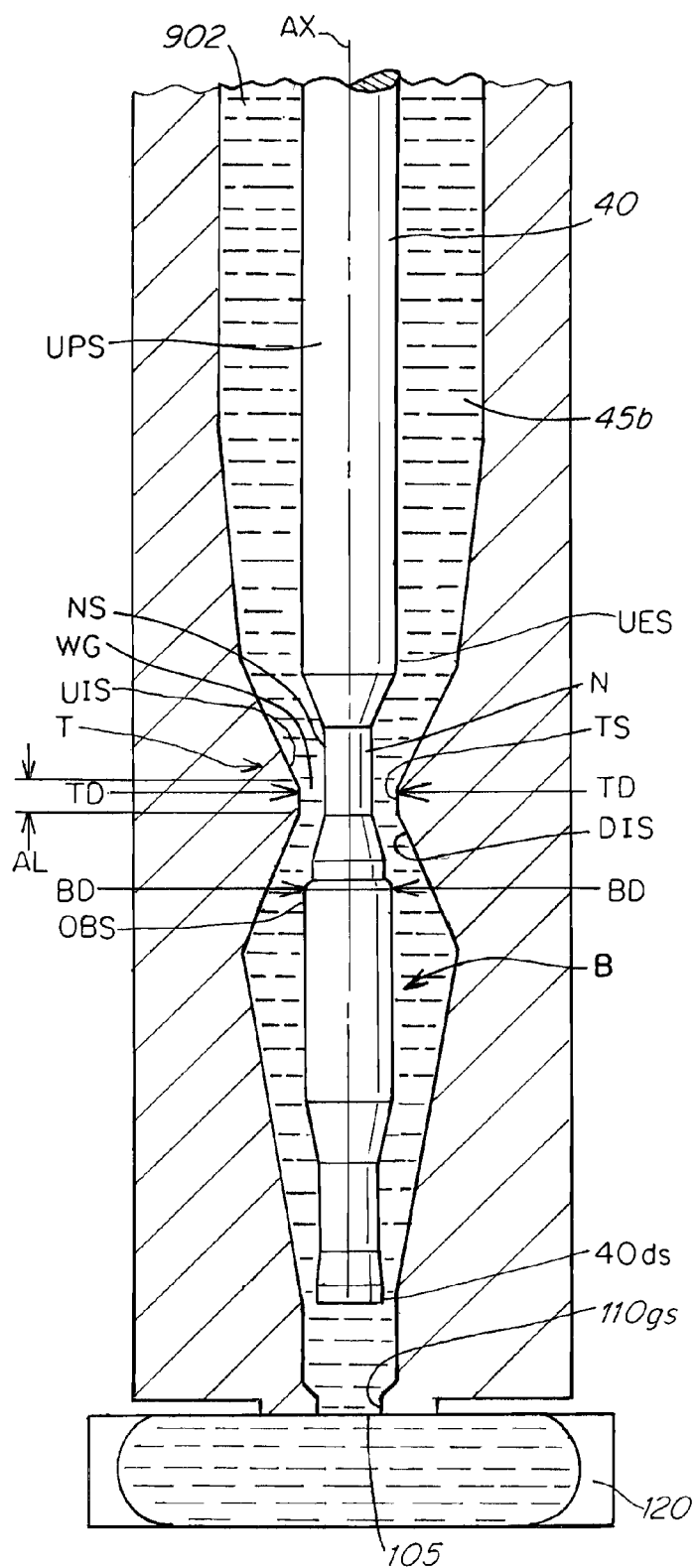
FIG. 5B is a side sectional view of the FIG. 5A components showing the valve pin disposed at an intermediate downstream gate open position subsequent to the starting point or time of an injection cycle.
Figure 5C:
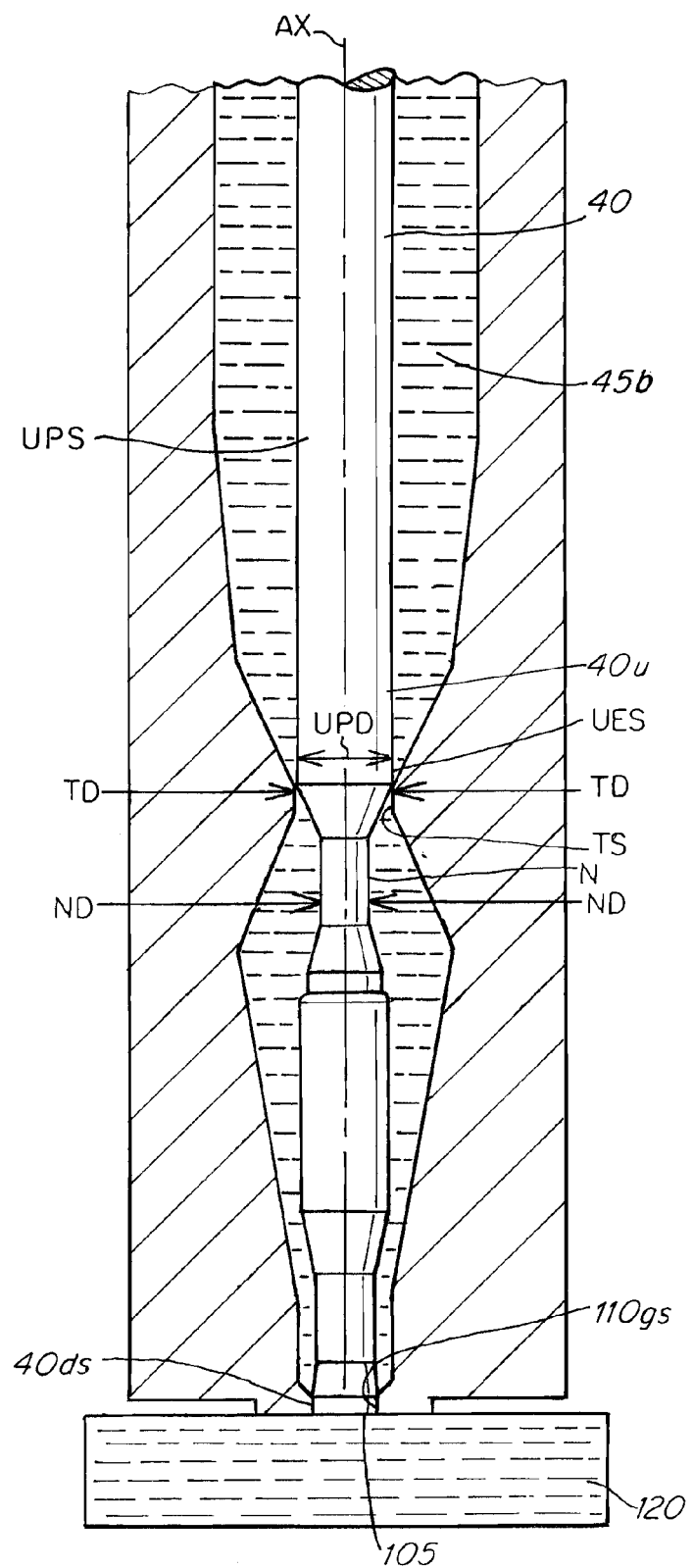
FIG. 5C is a side sectional view of the FIG. 5A components showing the valve pin disposed at a gate closed downstream position at the end of an injection cycle.

FIG. 2 shows a typical plot of pin position versus time for a valve as shown in FIGS. 5A-5C.

Figure 3:
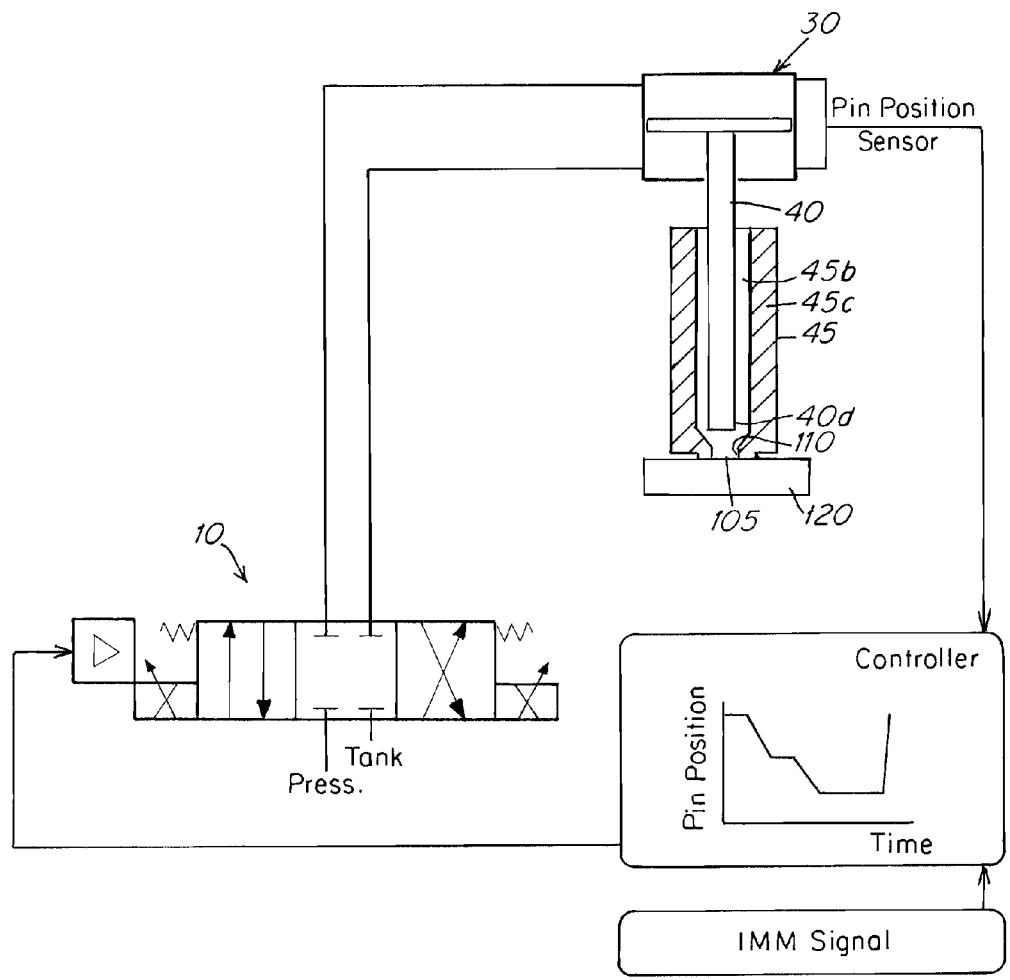
FIG. 3 is a schematic representation of one embodiment of interconnected valve, actuator, valve pin configuration and electronic controller components in an apparatus according to the invention where the controller uses a real time signal indicative of pin position as the basis for a controller program that controls driven position or velocity of the valve pin.

FIG. 3 shows a system where the valve 30, 40, 45 comprises a valve pin 40 that is cylindrical along its axial length the distal tip end 40*d* of which controls injection fluid flow through the gate 105 into the cavity 120 by controlled positioning of the tip end 40*d* relative to the interior surface 110 of the gate 105 by use of a proportional directional control valve such as described with reference to FIGS. 1A, 1B, 1C, 1D, 2.

Figure 4:
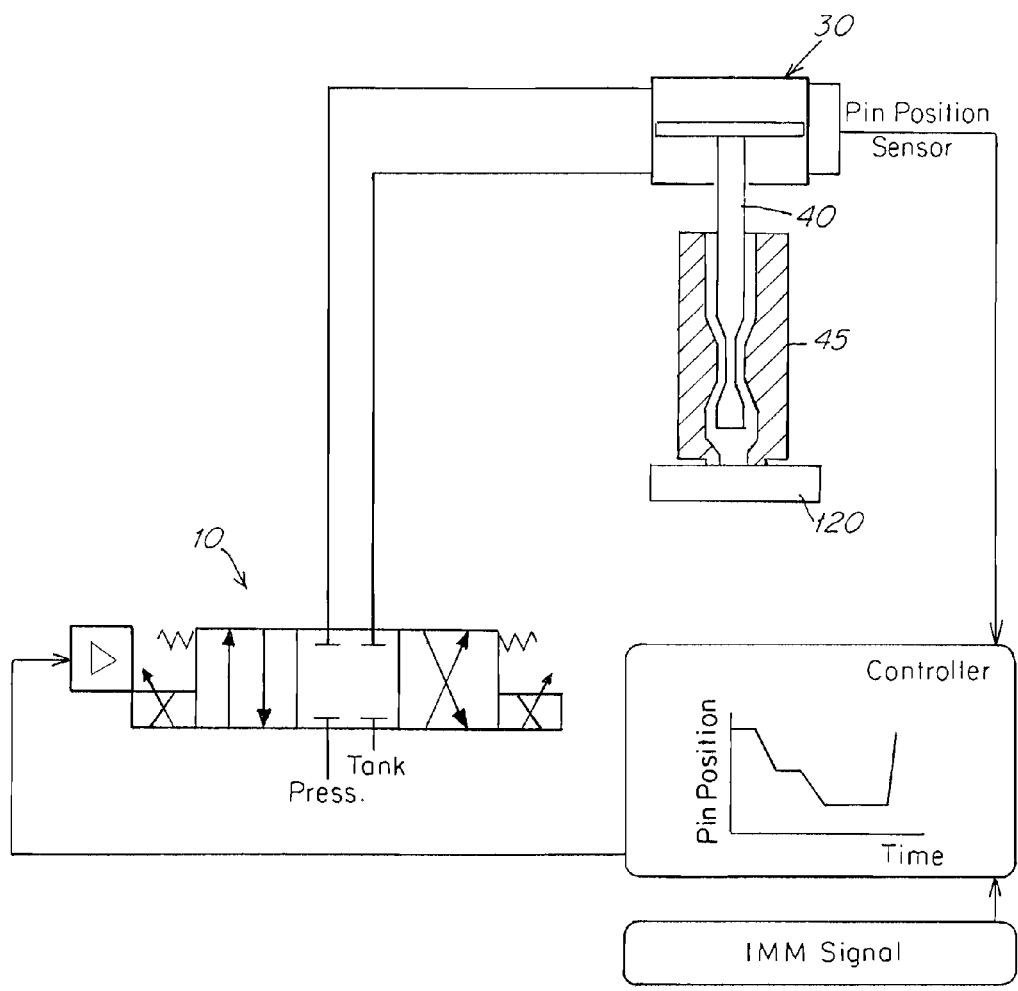
FIG. 4 is a schematic representation of another embodiment of interconnected valve, actuator, valve pin configuration and electronic controller components in an apparatus according to the invention where the controller uses a real time signal indicative of pin position as the basis for a controller program that controls driven position or velocity of the valve pin.

FIG. 4 shows an alternative system with advanced melt control capability by virtue of the use of a valve 30, 40, 45 configuration where the central flow channel 45*b* of a nozzle 45 and valve pin 40 have a configuration as shown in FIGS. 5A, 5B, 5C that include a bulb or widened diameter portion B of the pin 40 together with a narrowed neck N portion and a complementary throat section T of the nozzle channel 45*b* configured relative to the neck N of the pin 40 to enable an unrestricted flow when neck N is aligned with throat T and a restricted degree of flow of fluid 902 at a predetermined volume or velocity that is less than the volume or velocity of an unrestricted or free flow when the bulb portion B is aligned with the throat T.

As shown in the FIGS. 4, 5A-5C embodiment, the nozzle 45 has a central nozzle channel 45*b* that terminates downstream in a gate 105 that mates with a mold cavity 120. The nozzle channel 45*b* has a throat or throat section T disposed upstream from the gate 105 that has a narrowed in diameter interior throat surface TS extending an axial length AL at and along a selected intermediate upstream section of the nozzle channel 45*b*. Further upstream from the throat section T the nozzle channel 45*b* has an upstream section US that widens in diameter relative to the throat section T as well as the gate 105. The throat diameter TD of the throat surface TS is narrower or less than the diameters of the interior surfaces of the nozzle channel 45*b* that are disposed immediately upstream UIS and immediately downstream DIS of the throat surface TS. The inner circumferential surface of the throat TS has a selected throat configuration, contour or shape and has a preselected throat diameter TD.

The valve pin 40 shown in the FIGS. 5A-5C embodiment is configured to have a narrowed neck or neck portion N that has a diameter that is significantly less than the diameter TD of the throat portion of the nozzle channel 45*b* such that when the neck portion N is axially aligned with the axial length AL of the nozzle channel 45*b* a widened gap WG is formed between the outer circumferential surface NS of the neck N and the inner surface TS of the throat T which enables open free, full velocity flow of the injection fluid material 902 through the widened gap WG downstream toward and through the gate 105. The diameter of the neck portion is typically between about 2 mm and about 4 mm.

The valve pin 40 has an upstream portion UPS disposed upstream of the neck portion N. Downstream of the neck portion N, the valve pin has a bulb or bulbous portion B that has an outer circumferential bulb surface OBS that has configuration that is complementary to the configuration of the inner throat surface TS in axial length AL and shape generally. The maximum diameter of the surface OBS is typically less than the diameter UPD of the upstream portion UPS of the valve pin 40.

The maximum diameter of the surface OBS is also slightly less than the diameter TD of the throat surface TS such that when the bulb surface OBS is axially AX aligned with the axial length AL of the throat surface TS a restriction gap G is formed between the bulb surface OBS and the throat surface TS such that a relatively small amount of flow of injection fluid 902 that is less than full unrestricted flow is enabled to flow downstream through the channel 45*b* and through the gap. The gap G is between the bulb surface OBS and the throat surface TS when the surfaces OBS and TS are axially aligned is typically between about 0.05 and about 0.20 mm.

The diameter UPD of the upper section of the valve pin 40 is typically the same or about the same as the diameter TD of the throat T such that when the surfaces TS and UES mate, flow of injection fluid 902 through channel 45*b* is stopped.

The actuator 30 is preferably adapted to controllably drive the valve pin 40 between a downstream gate closed position, FIG. 5C, where the pin 40 prevents injection fluid from flowing through the gate either via closing off the gate 105 by mating of distal end pin surface 40*ds* with the interior surface 110*gs* of the gate 105 or via mating of the exterior surface UES of the upstream end portion 40*u* of the upstream portion UPS of the pin 40 with the throat surface TS, the upstream end 40*u* having a diameter UPD that is the same or about the same as the diameter TD of the throat T such that when the surfaces TS and UES mate flow of injection fluid is stopped.

Thus the nozzle channel 45*b* and the valve pin 40 are configured and adapted such that the pin 40 is movable axially upstream and downstream between positions where the valve pin 40 can be disposed in or driven to an upstream position such as shown in FIG. 5A where the downstream flow of injection fluid 902 is restricted by the bulb portion B of the pin being axially aligned with the narrow diameter throat portion T of the channel, and subsequently the pin 40 can be disposed in or driven to an intermediate downstream position such as shown in FIG. 5B where the downstream flow of injection fluid 902 is unrestricted and subsequently the pin 40 can be disposed in or driven to a fully downstream position as shown in FIG. 5C where the downstream flow of injection fluid is stopped at both the gate 105 and at the upstream position of the throat T by an upstream portion UPS of the pin 40 being axially aligned with the throat T. In the upstream position of the valve pin 40 when the bulb portion B is axially aligned with the throat T, a reduced volume or velocity of downstream flow of injection fluid 902 is enabled. The bulb portion N and the throat portion T are adapted to enable a restricted degree of downstream flow of fluid 902 at a predetermined volume or velocity that is less than the volume or velocity of an unrestricted or free flow that occurs when the neck portion N is axially aligned with the throat portion T of the channel 45*b*.

FIG. 5B shows the pin 40 in an intermediate axial downstream gate open position where the bulb portion B is axially aligned with the throat portion T and injection fluid 902 flows freely through the widened gap WG and the gate 105 without restriction from interaction between the outer circumferential surfaces of the pin 40 and inner surfaces 45*s* of the nozzle channel 45*b*.

In the FIG. 5A position, the pin 40 is disposed in an start of cycle or upstream flow restriction position where the outer surface OBS of the bulbous protrusion B is disposed in an axial alignment position with the axial length AL of the throat surface TS such that a flow restriction gap G having a size of typically between about 0.05 and 0.2 mm is formed between the outer circumferential surface OBS of the bulbous protrusion B and the inner circumferential surface TS of the throat T. The bulb B and the throat T are selectively configured such that the gap G is rendered large enough to enable a predetermined small amount of flow of injection fluid 902 through the gate at a predetermined relatively small or minimal flow rate that reduces the difference in fluid pressure between the upstream interior volume UIFP of the channel 45*b* and the downstream interior volume DIFP of the channel 45*b*.

At the beginning or at the start of an injection cycle using a valve configuration as shown in FIGS. 5A-5C, the pin 40 is disposed in the axial position shown in FIG. 5A. In the FIG. 5A start position, the injection fluid 902 immediately upstream of the bulb B and throat T has a pressure IFP that is at a maximum at a time immediately before the pin is moved downstream. The gap G is rendered large enough to reduce the pressure UIFP enough to cause a reduction in the difference in pressure between the upstream pressure UIFP of fluid 902 that is immediately upstream of the throat T and the downstream pressure DIFP of injection fluid 902 that is disposed immediately downstream of the throat T when the bulb B and throat T are axially aligned. This reduction in difference between pressures UIFP and DIFP results in a similar reduction in difference or "drop" in pressure between UIFP and DIFP when and during the course of travel of the valve pin from the position in FIG. 5A to the position in FIG. 5C.

Figure 6:
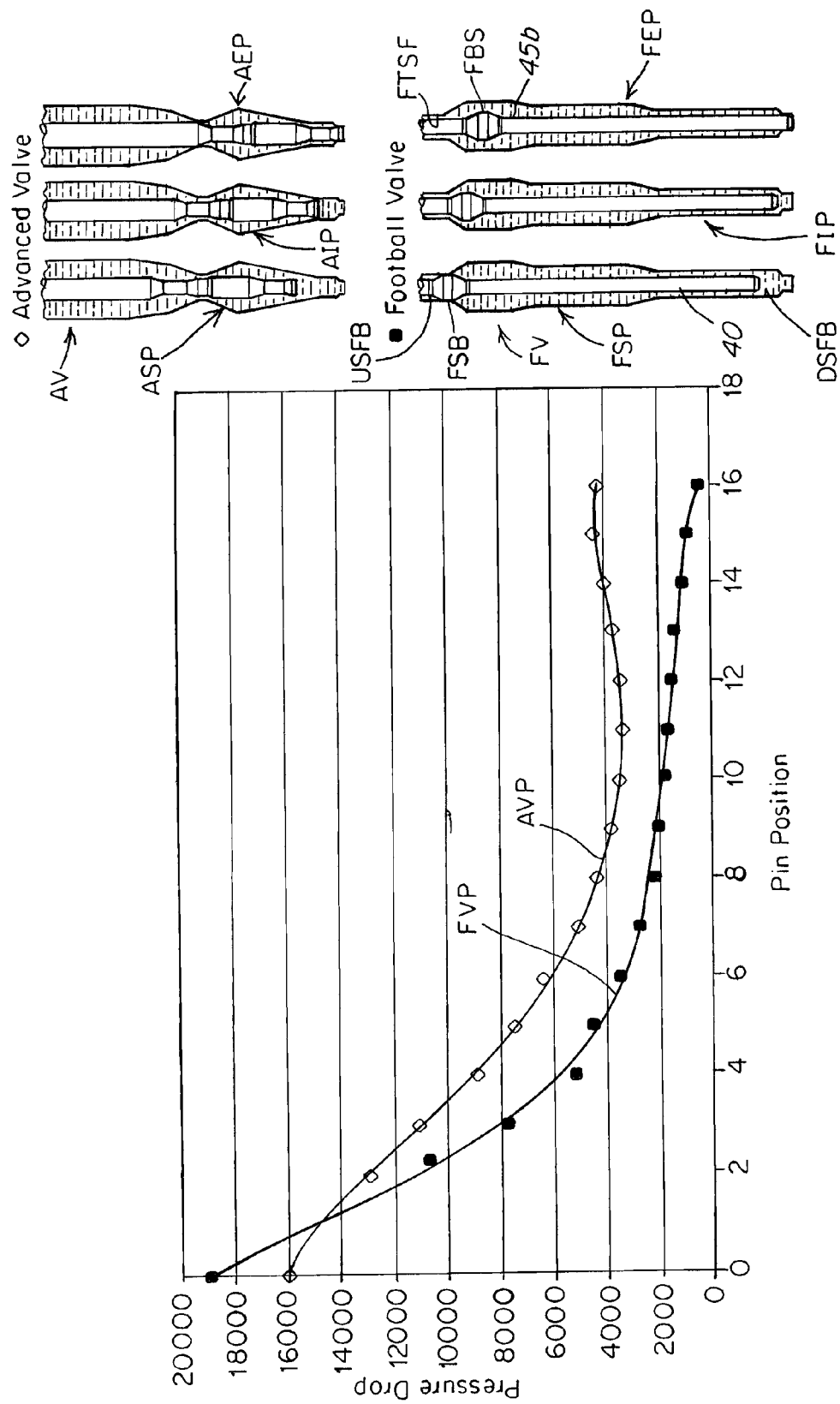
FIG. 6 is an exemplary plot of a drop in injection fluid pressure located within the nozzle of a valve having a configuration as shown in FIGS. 5A-5C versus position of the valve pin, the zero position of the valve pin being the position shown in FIG. 5A.
Figure 7:
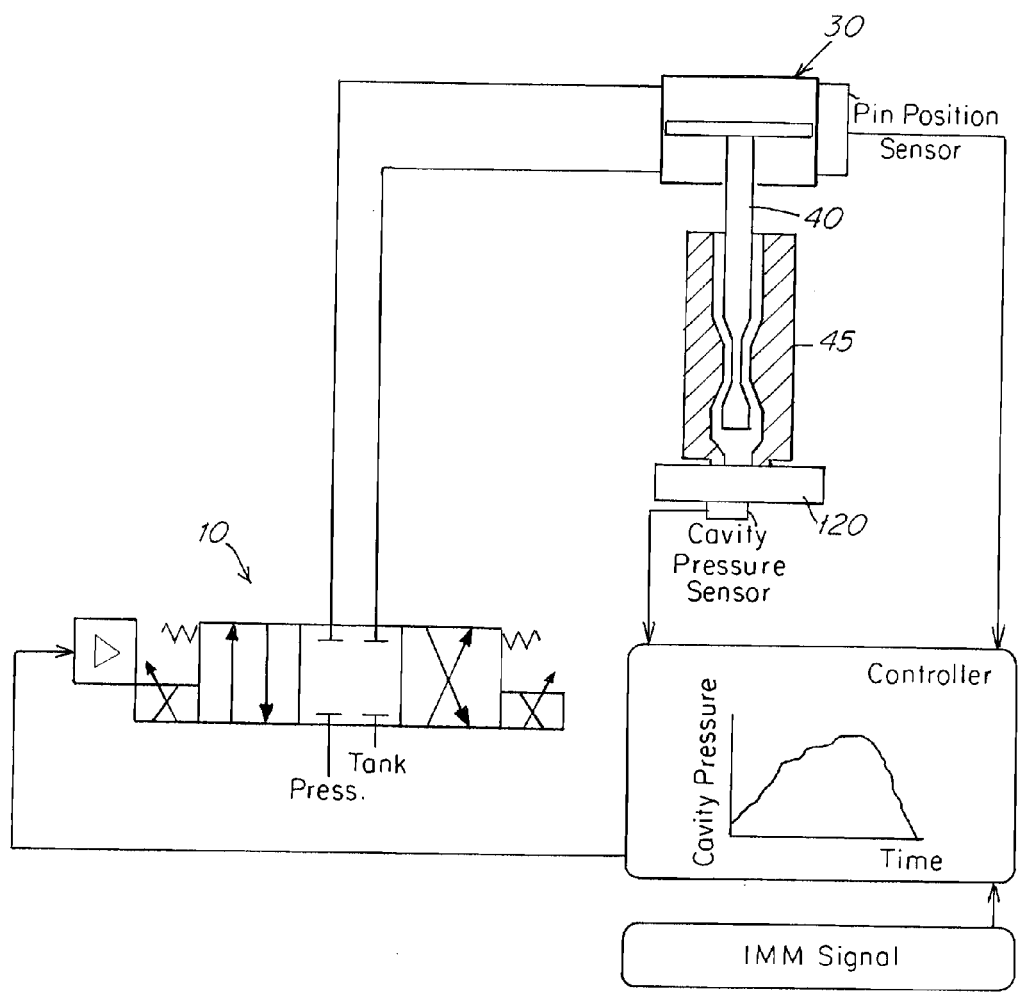
FIG. 7 is a schematic of a system according to the invention using a real time signal indicative of cavity pressure as the basis for a controller program that controls driven position or velocity of the valve pin.

FIG. 6 shows plots of the difference or drop in UIFP and DIFP as can exist using a valve according to the invention as shown for example in FIGS. 5A-5C that provides a small flow gap G, pressure difference plot AVP, versus the difference in upstream volume pressure USFB and downstream volume pressure DSFB when using a prior art valve that has a football-like FSB, FV configuration. FIG. 6 illustrates pressure difference plot FVP, where the outer surface FBS of an upstream football configured bulb FSB mates with the inner surface FTSF of the narrowed throat of the nozzle channel 45b in the start or upstream position FSP of the valve pin 40 and completely closes off or stops injection fluid flow in the start position FSP as shown in FIG. 6. When the football configured FSB pin 40 is subsequently driven downstream FIP from the start position FSP, injection fluid initially flows downstream from the upstream side of the football USFB to the downstream side of the football DSFB at a higher rate than it flows using the pin configuration AV of the present invention as described with reference to FIGS. 5A, 5B, 5C. Such a prior art football shaped or configured bulb and nozzle channel configuration are described in U.S. publication 20020086086 (such as shown in FIGS. 28, 29, 32 et seq.) the disclosure of which is incorporated herein by reference in its entirety. As shown in FIG. 6 by the difference between the plots AVP and FVP in FIG. 6, the lesser drop in pressure as between UIFP and DIFP (plot AVP versus plot FVP) when the pin is initially moved from the start position ASP to the intermediate position AIP reduces pressure spikes at the gate thus reducing the occurrence of haze or artifacts in the molded part at the position of the gate, and generally provides a smoother transition in flow of injection fluid from the upstream volume side UIFP to the downstream volume side DIFP of the flow of injection fluid 902. The smaller difference in pressure between the upstream side UIFP and the downstream side DIFP of the throat T creates less of a rush or a lesser velocity of flow injection fluid through gate 105 when the pin 40 is initially moved downstream beginning from the starting position as in FIG. 5A, plot AVP. And the AV configuration creates a generally more even pressure difference between fluid on the upstream side UIFP and the downstream side DIFP. As a comparison of plots FVP and AVP show, a higher rush or velocity of flow of fluid 902 through the gate 105 occurs when a prior art football FSP configured pin 40, FIG. 6, is initially moved downstream from a start of injection cycle upstream position FSP toward a downstream end of cycle gate closed position FEP, plot FVP.

The less extreme difference between upstream and downstream injection fluid 902 pressures as shown by plot AVP using the AV configured pin and channel configuration 45b of FIGS. 5A-5C also allows for injection fluid pressure to go past the area of the throat T restriction and act on the opposing downstream face of the bulbous portion B of the valve pin 40, reducing tensile forces on the pin 40 which enables a lower cost pin because strength requirements do not need to account for a full pressure build-up on the upstream side of the bulbous portion B.

What is claimed is:

1. An injection molding apparatus comprising an injection molding machine, a manifold that receives injection fluid from the machine and routes the injection fluid during the course of an injection cycle from an upstream end toward a downstream end of a fluid flow channel disposed in the manifold or a nozzle communicating with the manifold, the fluid flow channel having a flow axis and a channel length, the fluid flow channel communicating at the downstream end with a gate to a cavity of a mold, the apparatus including:

a valve pin driven by an actuator, the valve pin extending axially through at least a portion of the channel length of the fluid flow channel, the valve pin having an upstream end interconnected to the actuator and a downstream end, the valve pin being drivable by the actuator axially upstream and downstream through the fluid flow channel, the fluid flow channel including a throat having an inner circumferential surface having a selected throat configuration and throat diameter, the valve pin having bulbous portion having an outer circumferential surface and a bulb diameter adapted to interface with the inner circumferential surface of the throat to enable a restricted degree of volume or velocity of flow of injection fluid relative to a maximum degree of volume or velocity of flow when the bulbous portion of the valve pin is axially aligned with the throat, the valve pin being drivable to a maximum downstream position where a distal tip end of the valve pin closes the gate and stops flow of the injection fluid through the gate wherein the fluid flow channel and the valve pin are configured or adapted such that the valve pin is movable axially upstream and downstream between an upstream position where the downstream flow of the injection fluid is restricted by the bulbous portion of the pin being axially aligned with the throat of the channel, an intermediate position where downstream flow of injection fluid is unrestricted and a fully downstream position where downstream flow of injection fluid is stopped at both the gate and at the throat.

2. An injection molding apparatus comprising an injection molding machine, a manifold that receives injection fluid from the machine and routes the injection fluid during the course of an injection cycle from an upstream end toward a downstream end of a fluid flow channel disposed in the manifold or a nozzle communicating with the manifold, the fluid flow channel having a flow axis and a channel length, the fluid flow channel communicating at the downstream end with a gate to a cavity of a mold, the apparatus including:

a valve pin driven by an actuator, the valve pin extending axially through at least a portion of the channel length of the fluid flow channel, the valve pin having an upstream end interconnected to the actuator and a downstream end, the valve pin being drivable by the actuator axially upstream and downstream through the fluid flow channel, the fluid flow channel including a throat having an inner circumferential surface having a selected throat configuration and throat diameter, the fluid flow channel and the valve pin being configured or adapted such that the valve pin is movable axially upstream and downstream between an upstream position where the downstream flow of the injection fluid is restricted by a bulb portion of the pin being axially aligned with the throat of the channel, an intermediate position where downstream flow of injection fluid is unrestricted and a fully downstream position where downstream flow of injection fluid is stopped at both the gate and at the throat, wherein the bulbous protrusion and the throat are adapted to enable a restricted flow of the injection fluid from an upstream side of the bulbous protrusion to a downstream side of the bulbous protrusion that reduces tensile forces on the pin when the bulbous protrusion is axially aligned with the throat.

3. The apparatus of claim 2 wherein:

the actuator is driven by a valve assembly comprised of a housing and a spool slidably mounted and controllably movable back and forth along an axis within the housing between two or more drive fluid flow positions, the spool being mechanically driven by first and second actuators or solenoids that each separately engage the spool at opposing axial ends to effect movement of the spool back and forth between the drive fluid flow positions.

4. The apparatus of claim 3 wherein the actuators or solenoids are drivable in only one linear direction and adapted such that the first solenoid or actuator drives the spool in a first linear direction and the second solenoid or actuator drives the spool in a second linear direction opposite the first linear direction the first and second solenoids or actuators being drivable at different times such that the spool is driven by only one or the other of the first and second solenoids or actuators at any one selected point in time.

5. The apparatus of any of the claim 3 wherein the actuators or solenoids are controllably energizable to drive the spool a distance or length of travel or at a velocity of travel that is proportional to the degree or amount of voltage, current or power that is applied to the actuators or solenoids.

6. An injection molding apparatus comprising an injection molding machine, a manifold that receives injection fluid from the machine and routes the injection fluid during the course of an injection cycle from an upstream end toward a downstream end of a fluid flow channel disposed in the manifold or a nozzle communicating with the manifold, the fluid flow channel having a flow axis and a channel length, the fluid flow channel communicating at the downstream end with a gate to a cavity of a mold, the apparatus including:

a valve pin driven by an actuator, the valve pin extending axially through at least a portion of the channel length of the fluid flow channel, the valve pin being drivable between a downstream gate closed position, an upstream gate open position where injection fluid flows freely through the gate, the actuator being interconnected to and driven by a valve assembly comprised of a housing and a spool slidably mounted and controllably movable back and forth along an axis within the housing between two or more drive fluid flow positions, the spool being mechanically driven by first and second actuators or solenoids that each separately engage the spool at opposing axial ends to effect movement of the spool back and forth between the drive fluid flow positions, the first and second actuators or solenoids being drivable in only one linear direction and adapted such that the first solenoid or actuator drives the spool in a first linear direction and the second solenoid or actuator drives the spool in a second linear direction opposite the first linear direction, the first and second solenoids or actuators being drivable at different times such that the spool is driven by only one or the other of the first and second solenoids or actuators at any one selected point in time, wherein the fluid flow channel and the valve pin are configured or adapted such that the valve pin is movable axially upstream and downstream between an upstream position where the downstream flow of the injection fluid is restricted by the bulbous portion of the pin being axially aligned with a throat of the channel, an intermediate position where downstream flow of injection fluid is unrestricted and a fully downstream position where downstream flow of injection fluid is stopped at both the gate and at the throat.

* * * * *